(12) United States Patent
Turek et al.

(10) Patent No.: US 6,511,336 B1
(45) Date of Patent: Jan. 28, 2003

(54) SOLDERLESS FLEX TERMINATION FOR MOTOR TAB

(75) Inventors: James A. Turek, La Grange, IL (US); Kenneth G. Irish, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/578,548

(22) Filed: May 25, 2000

(51) Int. Cl.[7] .......................... H01R 13/64; H01R 11/22
(52) U.S. Cl. ....................... 439/249; 439/246; 439/857; 439/947; 439/84
(58) Field of Search ................................. 439/947, 246, 439/247, 248, 249, 250, 251, 857, 55, 84, 252, 382

(56) References Cited

U.S. PATENT DOCUMENTS

| | | | | |
|---|---|---|---|---|
| 4,257,668 A | * | 3/1981 | Ellis, Jr. ...................... | 439/59 |
| 4,952,529 A | * | 8/1990 | Grider .......................... | 29/836 |
| 4,978,307 A | * | 12/1990 | Billman et al. ............... | 439/83 |
| 5,064,379 A | * | 11/1991 | Ryll et al. .................... | 439/81 |
| 5,597,332 A | * | 1/1997 | Walbrecht .................... | 439/850 |
| 6,089,880 A | * | 7/2000 | Miyagawa et al. ........... | 439/82 |
| 6,193,567 B1 | * | 2/2001 | Hsieh .......................... | 439/853 |

* cited by examiner

*Primary Examiner*—Brian Sircus
*Assistant Examiner*—Michael C. Zarroli
(74) *Attorney, Agent, or Firm*—Mark W. Croll; Paul F. Donovan; Donald J. Breh

(57) ABSTRACT

An electrical connector for connecting and mounting a motor upon a printed circuit board comprises a flexible connection between contact fingers of the connector and a base portion of the connector which serves to isolate the motor from the printed circuit board such that vibrations generated by the motor are not transmitted to the printed circuit board. Movable support members mounted upon the base portion also effectively rigidly support the flexibly mounted contact fingers so as to facilitate insertion of motor tab contacts into engagement with the contact fingers of the connector. The printed circuit board is also a printed thick film type printed circuit board, and the connector comprises three dependent leg members which are adapted to be inserted through apertures defined within the printed circuit board and folded beneath the board so as to secure the connector upon the board.

23 Claims, 4 Drawing Sheets

SOLDERLESS FLEX TERMINATION FOR MOTOR TAB

FIELD OF THE INVENTION

The present invention relates generally to electrical connectors, and more particularly to an electrical connector for flexibly mounting a motor upon a printed circuit board such that the printed circuit board is effectively isolated from vibrations emanating from the motor, and in addition, for electrically connecting the motor to the printed circuit board in a solderless manner.

BACKGROUND OF THE INVENTION

Printed thick film (PTF) printed circuit boards, which comprise, for example, carbon filled ink or silver filled ink, are a known alternative to conventional copper plated printed circuit boards. It is also known or desirable to use such printed thick film printed circuit boards in lieu of conventional copper plated printed circuit boards in view of the fact that such printed thick film printed circuit boards are less expensive to fabricate and are more environmentally acceptable or desirable due to the fact that no plating or heavy metals are involved in accordance with the processing or fabrication techniques for manufacturing such printed thick film printed circuit boards.

One operational disadvantage or drawback, however, of utilizing such printed thick film printed circuit boards is that in view of the use of the carbon filled ink or silver filled ink, electrical connections required with respect to connecting or mounting various components upon the printed circuit board cannot be achieved by means of conventional soldering techniques. Various alternative techniques for electrically attaching or mounting such various components upon printed thick film printed circuit boards have therefore of course been contemplated, however, such techniques have not proven particularly successful for various reasons. For example, in accordance with one known attachment technique, the attachment procedures cannot be automated and are therefore labor intensive. In accordance with another known attachment technique, it is difficult to spatially accommodate the various components upon the printed circuit board in view of the fact that space upon the printed circuit board is often severely limited.

A need therefore exists in the art for a new and improved electrical connector which is adapted for electrical connection to printed circuit boards, and more particularly, for electrical connection to printed thick film type printed circuit boards, whereby the electrical connector can be mounted upon printed thick film type printed circuit boards in accordance with crimped connection techniques. In addition, a need exists in the art for a new and improved electrical connector which is adapted for electrical connection to printed circuit boards whereby, for example, vibrations from an electrical component to be mounted upon the printed circuit board can effectively be isolated whereby such vibrations are not transmitted to the printed circuit board so as to not adversely affect the electrical connections and operations of the printed circuit board.

OBJECTS OF THE INVENTION

Accordingly, it is an object of the present invention to provide a new and improved electrical connector which is especially structured for connection to printed circuit boards, and more particularly, for connection to printed thick film type printed circuit boards.

Another object of the present invention is to provide a new and improved electrical connector which is able to overcome the various operational disadvantages and drawbacks characteristic of conventional electrical connectors for electrically connecting electrical components to printed thick film type printed circuit boards.

An additional object of the present invention is to provide a new and improved electrical connector for electrically connecting electrical components to printed thick film type printed circuit boards wherein the printed circuit board is effectively isolated by means of the electrical connector from the electrical component to be mounted upon the printed circuit board such that vibrations from the electrical component are not transmitted to the printed circuit board so as not to adversely the electrical connections to the printed circuit board or the printed circuit board circuits.

A further object of the present invention is to provide a new and improved electrical connector for electrically connecting electrical components to printed thick film type printed circuit boards wherein the electrical connections are securely achieved by means of crimped connections.

SUMMARY OF THE INVENTION

The foregoing and other objectives are achieved in accordance with the teachings and principles of the present invention through the provision of a new and improved electrical connector which comprises a base portion for mounting upon the printed circuit board, pairs of oppositely disposed contact beams or fingers for establishing electrical contact with electrical contact tabs of an electrical component to be mounted upon the printed circuit board, and a flexible, substantially S-shaped or reversely oriented question-mark (?) shaped member which integrally interconnects the contact beams or fingers to the base portion in a flexible cantilevered manner which effectively vibrationally isolates the electrical component from the printed circuit board such that vibrations from the electrical component are not transmitted to the printed circuit board. The base portion also comprises a pair of oppositely disposed flexible contact supports which are able to be compressed together by means of a suitable tool such that they can support the contact beams or fingers when the electrical component contact tabs are to be inserted between the electrical connector contact beams or fingers, and which return to their original positions upon insertion of the electrical component contact tabs into the electrical connector contact beams or fingers and removal of the application or insertion tool. Still further, the base portion of the electrical connector is provided with three dependent legs which are adapted to be folded beneath the printed circuit board in a crimped manner so as to secure the electrical connector to the printed circuit board.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 4:
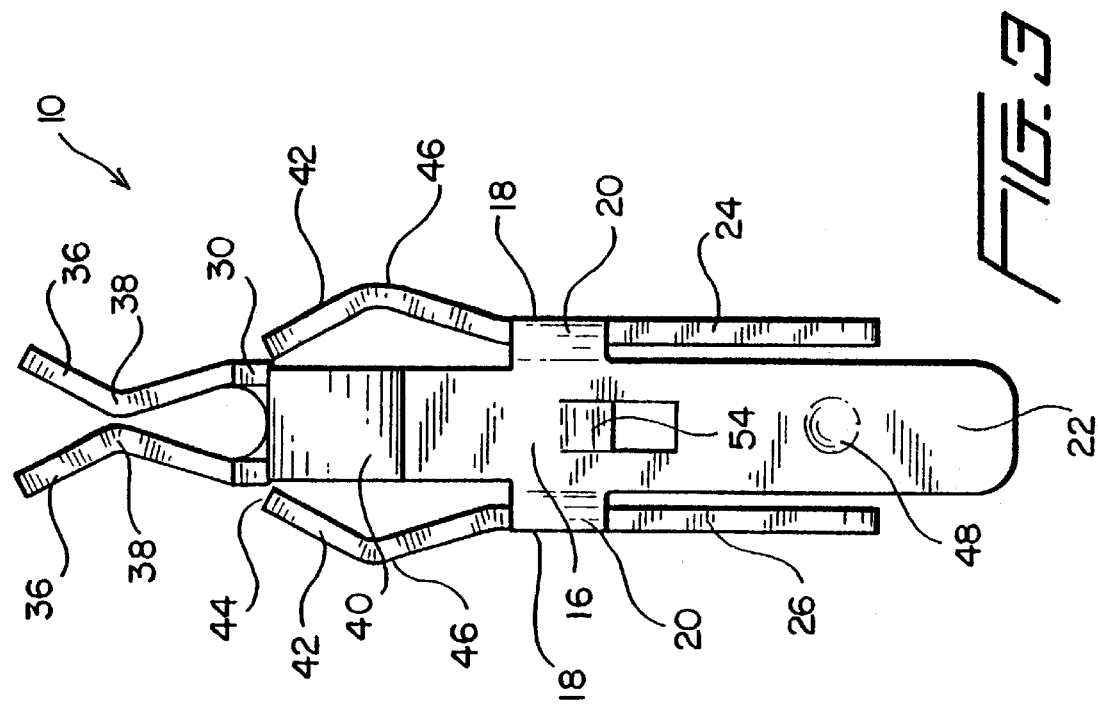
FIG. 4 is a rear elevational view of the electrical connector shown in FIG. 1.
Figure 5:
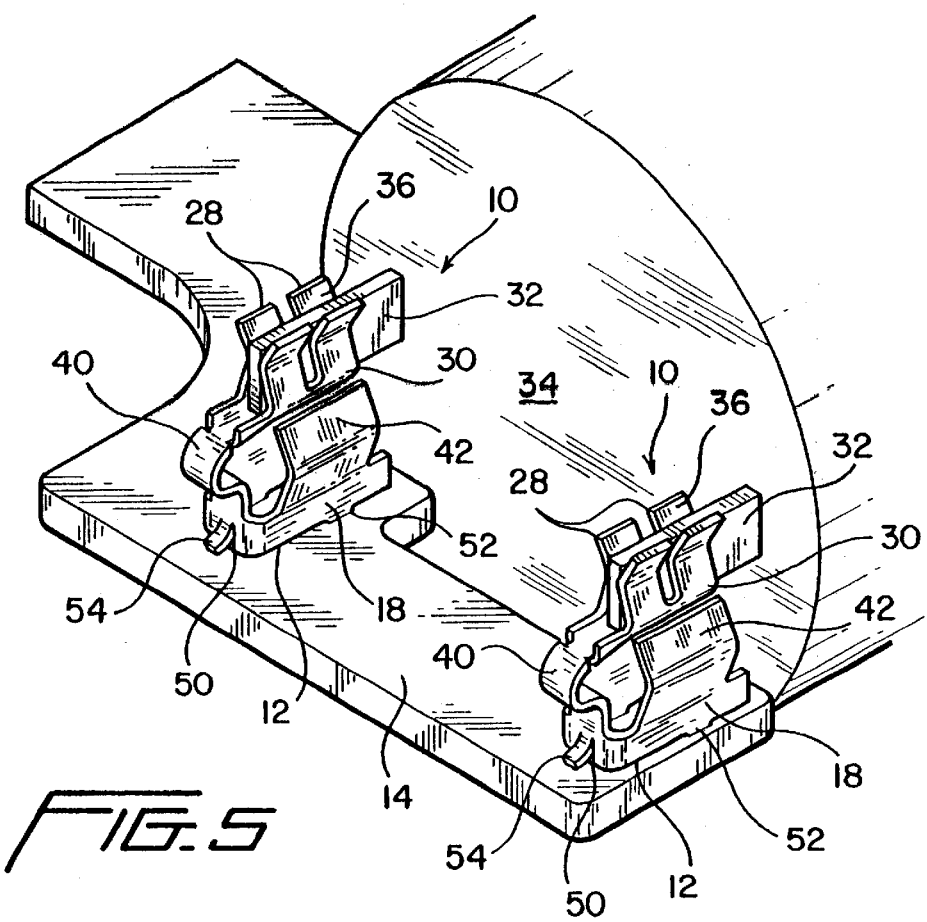
FIG. 5 is a perspective view showing a printed circuit board assembly wherein an electrical component is mounted upon the printed circuit board by means of a plurality of electrical connectors of the type shown in FIG. 1.

Referring now to the drawings, and more particularly to FIGS. 1–5 thereof, a first embodiment of a new and improved electrical connector, uniquely structured in accordance with the teachings and principles of the present invention for use in electrically connecting and mounting components upon a printed thick film type printed circuit board, is disclosed and is generally indicated by the reference character 10. The electrical connector 10 comprises a metal stamping which in effect is folded in half upon itself so as to comprise a three-sided structure. More particularly, the electrical connector is seen to comprise a three-sided, substantially C-shaped base portion 12 which, as best seen in FIG. 5, is adapted to support the electrical connector upon a printed circuit board 14 when the electrical connector 10 is mounted upon the printed circuit board 14 as will be more fully discussed hereinafter. The base portion 12 comprises a laterally or transversely disposed end portion 16 and a pair of oppositely disposed longitudinally extending side portions 18,18 integrally connected to the end portion 16 by means of rounded corner portions 20,20. A first dependent leg member 22 is integrally connected to a bottom portion of the base end portion 16, a second dependent leg member 24 is integrally connected to a bottom portion of a first one of the longitudinally extending base side portions 18, and a third dependent leg member 26 is integrally connected to a bottom portion of a second one of the longitudinally extending base side portions 18. As best appreciated from FIG. 2, the second and third dependent leg members 24,26 are longitudinally offset with respect to each other, and the purpose and use of the three dependent leg members 22,24, 26 will be discussed more fully hereinafter in connection with the actual mounting of the electrical connector 10 upon the printed circuit board 14.

In accordance with one of the unique features characteristic of the present invention, two pairs of electrical contact beams or fingers 28 are integrally mounted in a longitudinally separate array upon a support beam 30. The contact beams or fingers 28 are provided for physically accommodating electrical connection tabs 32 of an electrical component which, in this instance, is illustrated as a motor 34, whereby the motor 34 can be electrically connected to the printed circuit board 14. Accordingly, the contact beams or fingers 28 comprise reversely bent members whereby divergent upper portions 36 effectively define an entrance or mouth portion for facilitating insertion of the motor connection tabs 32 toward their mounted positions between central bite portions 38 of the contact beams or fingers 28 by means of which the motor connection tabs 32 are securely retained upon the electrical connector 10. The support beam 30 is also seen to be integrally connected to the base end portion 16 by means of a flexible, substantially S-shaped or reversely oriented question-mark (?) shaped member 40, as illustrated or seen in FIGS. 1,2, and 5, whereby the support beam 30 and the contact beams or fingers 28 are in effect mounted in a flexible cantilevered manner upon the base portion 12. In this manner, the flexible connection of the contact beams or fingers 28, and their associated motor connection tabs 32, to the base portion 12 through means of the flexible connection member 40, effectively vibrationally isolates the electrical motor component 34 from the base portion 12 and the printed circuit board 14 such that vibrations from the electrical motor component 34 are not transmitted to the printed circuit board 14 so as not to adversely affect the various electrical connections and operations of the printed circuit board 14.

In view of the fact that the electrical connector contact beams or fingers 28 and its support beam 30 are flexibly mounted upon the base portion 12 of the electrical connector 10, through means of the flexible vibration-isolation member 40, in a cantilevered manner, it can be appreciated that the insertion and physical connection of the motor component connection tabs 32 would ordinarily be somewhat difficult to readily achieve in view of the fact that as the motor component connection tabs 32 are being moved downwardly and attempted to be inserted between the bite portions 38 of the electrical connector contact beams or fingers 28, the entire support beam member 30, and the contact beams or fingers 28 supported thereon, will tend to deflect downwardly. Accordingly, in order to successfully achieve the easy and ready or reliable insertion of the motor component electrical connection tabs 32 into physical and electrical engagement and connection with the electrical connector contact beams or fingers 28, adequate support must be provided for the support beam member 30 and its associated electrical contact beams or fingers 28. In accordance, therefore, with another unique feature of the present invention, it is further seen and best appreciated from FIGS. 1 and 3–5 that a flexible contact beam support member 42 is integrally provided in a cantilevered manner upon the upper surface portion of each one of the base side portions 18,18 such that an upper free or distal end portion 44,44 of each support member 42,42 is disposed adjacent to and laterally outwardly beneath opposite undersurface portions of the electrical contact support beam 30 when the contact beam support members 42,42 are disposed in their normal, undeflected positions.

When it is desired, however, to insert, for example, the motor component electrical connection tab members 32 into physical and electrical engagement with the electrical connector contact beams or fingers 28, and in particular, between the bite portions 38 thereof, a tool, not shown, is brought into contact with outer convexly configured central portions 46,46 of each one of the support members 42,42. The tool, not shown, is adapted to compress the support members 42,42 toward each other. Accordingly, the upper distal or free end portions 44,44 of the support members 42,42 will now be disposed directly beneath lateral side or undersurface portions of the contact support beam 30. In this manner, when downward force is impressed upon the electrical connector contact beams or fingers 28, and the support beam 30, as a result of the downward insertion of the motor component electrical connection tabs 32,32 into engagement with the connector beams or fingers 28, the connector beams or fingers 28, and their associated support beam 30, will not experience downward deflection due to the engagement with the upper distal end portions 44,44 of the support members 42,42. The support members 42,42 therefore provide requisite support for, and resistance to any downward deflection of, the electrical connector beams or fingers 28 and their associated beam 30 whereby the motor component electrical connection tabs 32,32 can in fact be easily and readily inserted into the bite portions 38,38 of the electrical connector contact beams or fingers 28. Upon complete insertion of the motor component electrical connection tabs 32,32 into physical and electrical connection with the electrical connector contact beams or fingers 28, the tool, not shown, is withdrawn or retracted whereby the contact support members 42,42 are permitted to regain, or return to, their normal undeflected positions shown in FIGS. 1 and 3–5.

Lastly, it is to be remembered and especially noted that the electrical connector has been developed and structured in accordance with the principles and teachings of the present invention in order to provide a viable electrical connector which is able to electrically connect and physically mount components upon a printed thick film type printed circuit board which is not adaptable to, or able to operationally accommodate, soldered electrical connections. Accordingly, as can again best be appreciated from FIGS. 1–5, in order to establish the electrical connection of the motor component 34 to the printed circuit board 14 through means of the electrical connector 10, the first dependent leg member 22 of the electrical connector 10 is seen to comprise a dimpled portion 48. In addition, the printed circuit board 14 is provided with a plurality of apertures or slots, only two of which 50,52 are shown, which respectively accommodate the three dependent leg members 22,24,26 as can best be appreciated from FIG. 5. A tab member 54 is also integrally formed upon the end portion 16 of the connector base 12, as a result of being punched out from first dependent leg member 22, so as to engage the upper surface of the printed circuit board 14 when the electrical connector 10 is mounted upon the printed circuit board 14.

When the electrical connector 10 is thus mounted upon the printed circuit board 14 wherein the three dependent leg members 22,24,26 are inserted downwardly through the slots or apertures 50,52, and the third aperture or slot not shown, electrical contact is established between the electrical connector 10 and the printed circuit board 14 through means of the dimpled portion 48 of the first dependent leg member 22 being engaged with an undersurface portion of the printed circuit board 14 as a result of the first dependent leg member 22 being folded longitudinally beneath the printed circuit board 14. Subsequently, the second dependent leg member 24 is folded laterally or transversely so as to be disposed atop the first folded leg member 22 and force the distal end portion of the first folded leg member 22 into engagement with an undersurface portion of the printed circuit board 14 along with the dimpled portion 48. Lastly, the third dependent leg member 26 is also folded laterally or transversely so as to likewise be disposed atop the first folded leg member 22 and therefore secure the first folded leg member 22, and its dimpled portion 48, at its folded position and into engagement with the undersurface of the printed circuit board 14. It can be appreciated from FIG. 2 that the second and third leg members 24,26 are longitudinally offset with respect to each other. This structure permits the second and third leg members 24,26 to engage longitudinally separate portions of the first folded leg member 22 whereby the electrical connector 10 is secured upon the printed circuit board 14 in a stable manner while establishing good electrical connection with the printed circuit board 14.

Figure 6:
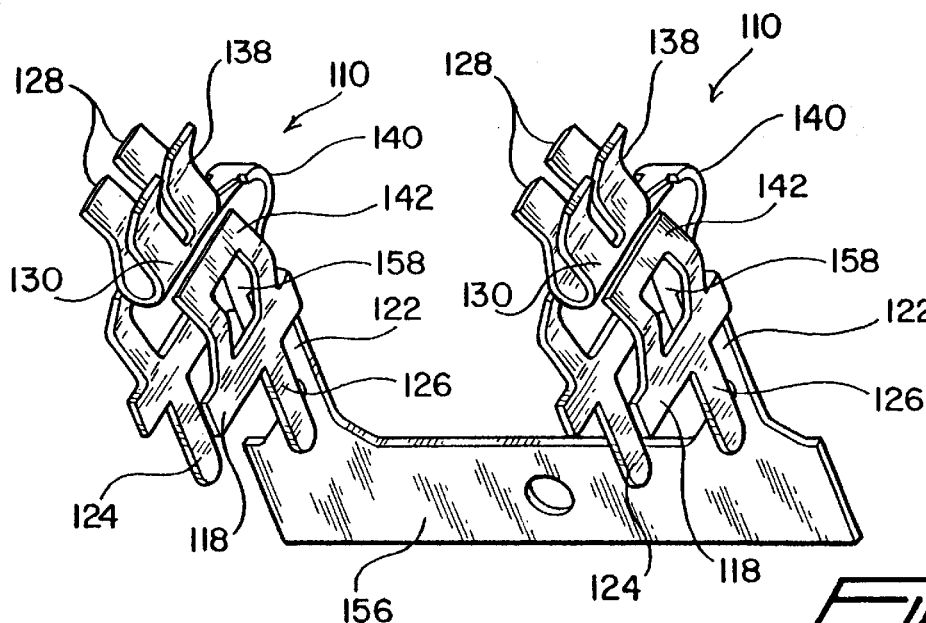
FIG. 6 is a perspective view of a manufactured carrier strip having electrical connectors integrally formed thereon wherein the electrical connectors comprise second embodiments of a new and improved electrical connector constructed in accordance with the principles and teachings of the present invention for providing electrical connection of electrical components to printed thick film type printed circuit boards in a vibration-isolated manner similar to that of the first embodiment of the electrical connector as disclosed within FIG. 1.

With reference now lastly being made to FIG. 6, a second embodiment of a new and improved electrical connector, uniquely structured in accordance with the teachings and principles of the present invention for use in electrically connecting and mounting components upon a printed thick film type printed circuit board, is disclosed and is generally indicated by the reference character 110. It is noted that the second embodiment electrical connector 110 is substantially identical to the first embodiment electrical connector 10, with one major difference which will be described shortly hereinafter, and consequently, the various component parts of the connector 110 which are similar to the corresponding parts of the first embodiment connector 10 will be denoted by similar reference characters except that the reference characters will be in the 100 series. More particularly, it is seen that a plurality of electrical connectors 110 are shown as still being integrally secured to a manufacturing carrier strip 156, and it is seen that each one of the electrical connectors 110 comprises, for example, the three dependent leg members 122,124,126, contact beams or fingers 128, support beam 130, flexible connection member 140, and contact support members 142,142. As can be appreciated, the only major difference between the electrical connector 110 and the electrical connector 10 resides in the fact that each one of the contact support members 142,142 is provided with an aperture or cut-out region 158 whereby the contact support members 142,142 are rendered somewhat more flexible than their counterparts 42,42. This facilitates the inward compression of the support members 142,142 toward each other by means of the aforenoted tool, not shown, when it is desired to use the support members 142,142 to support the contact beam member 130 in order to prevent downward deflection of the beam member 130 and the contact beams or fingers 128,128 mounted thereon when, for example, motor tabs, similar to motor tabs 32, are being inserted into the contact beams or fingers 128,128 and between the bite portions thereof.

Thus, it may be seen that in accordance with the principles and teachings of the present invention, there has been provided a new and improved electrical connector which easily and readily achieves electrical connection of a component to a printed thick film type printed circuit board. In addition, the connector isolates the component from the printed circuit board such that vibrations from the component are not transmitted to the printed circuit board. Still further, insertion of component tabs into engagement with the connector contact fingers is facilitated by properly supporting the fingers so as to prevent deflection thereof during the component tab insertion process despite the cantilevered mounting of the fingers upon the electrical connector.

Figure 7:
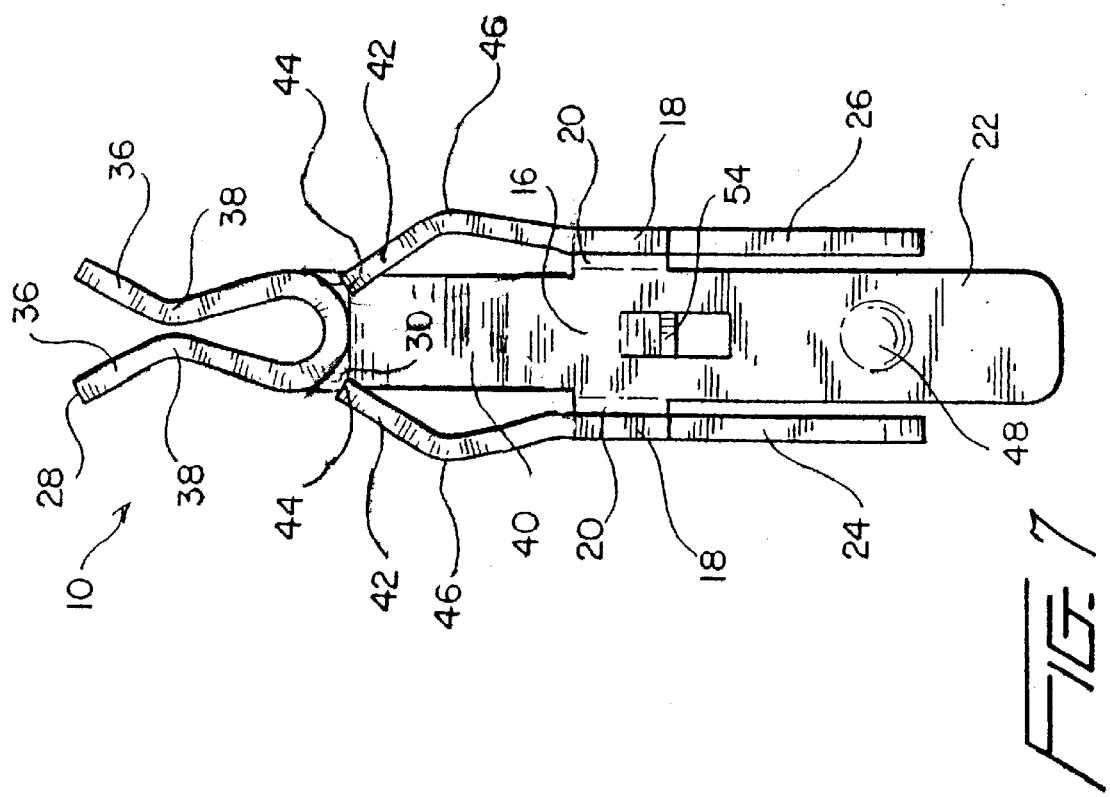
FIG. 7 is a similar view to that shown in FIG. 4 but shows the movable means in a first position thereof fixedly engaged with both of the electrical contacts.

FIG. 7 is a similar view to that shown in FIG. 4 but shows the movable means or support members 42, 42 in a first position thereof compressed toward each other and thus fixedly engaged with both of the electrical contacts or electrical connector contact beams or fingers 28. However, FIG. 4 shows the movable means 42, 42 in a second position.

Figure 2:
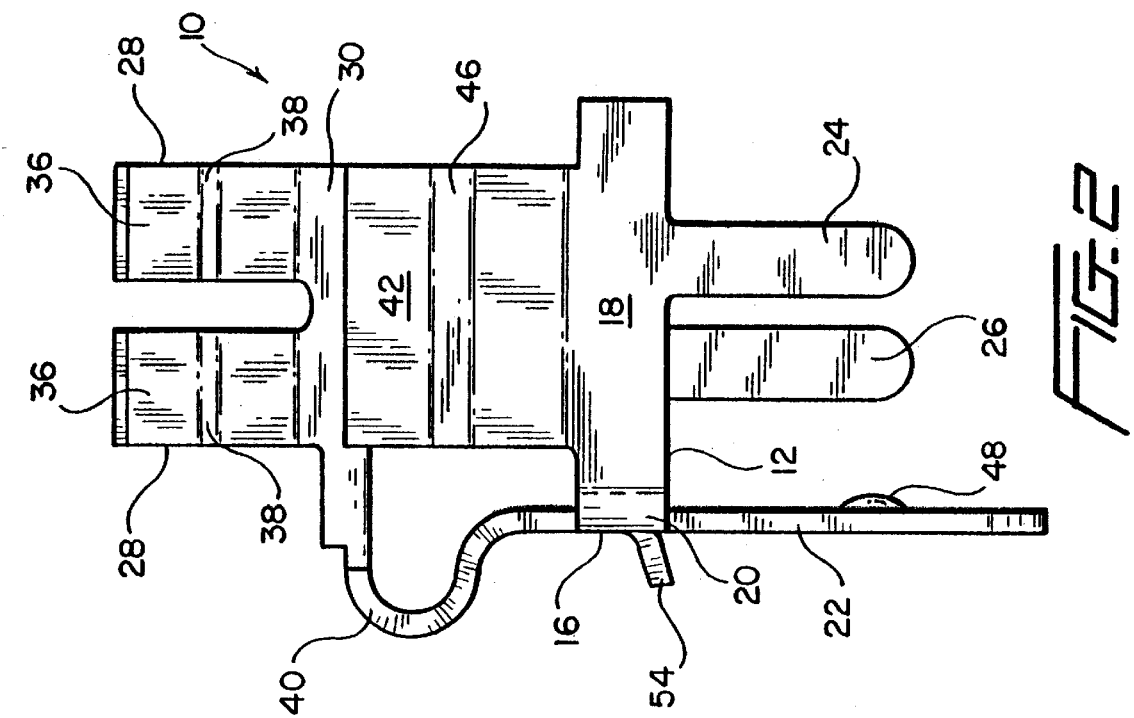
FIG. 2 is a side elevational view of the electrical connector shown in FIG. 1.
Figure 1:
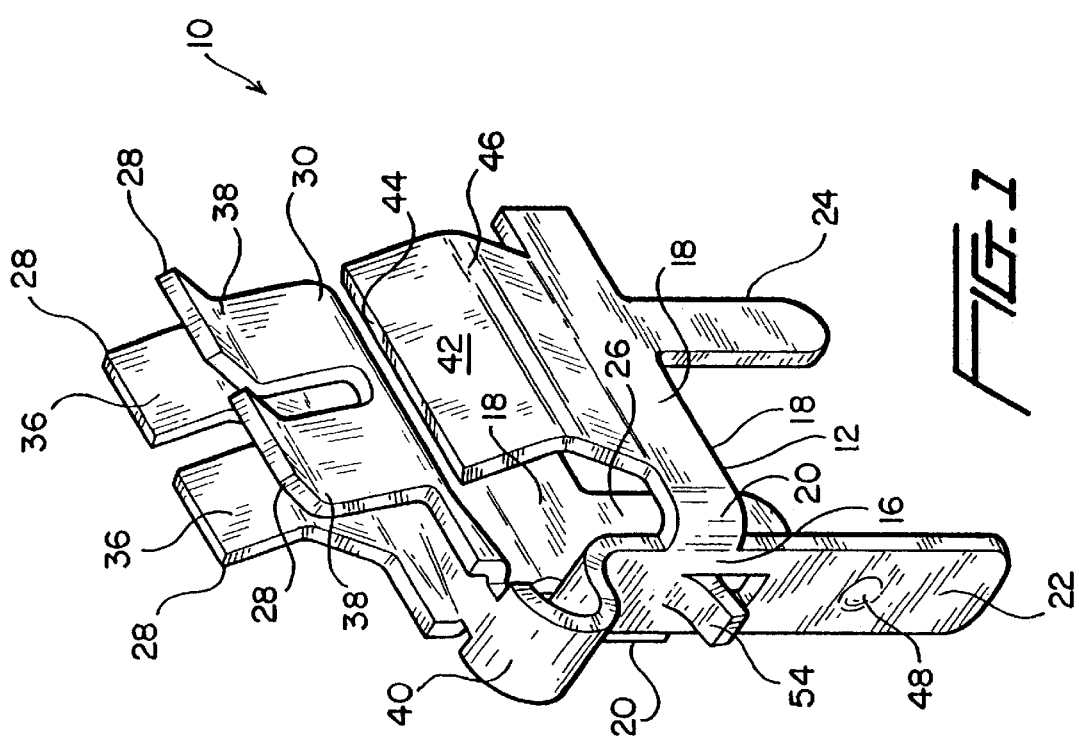
FIG. 1 is a perspective view of a first embodiment of a new and improved electrical connector constructed in accordance with the principles and teachings of the present invention and particularly structured for mounting electrical components upon a printed thick film type printed circuit board in a manner which effectively isolates the printed circuit board from the electrical component such that vibrations emanating from the electrical component are not transmitted to the printed circuit board.
Figure 3:
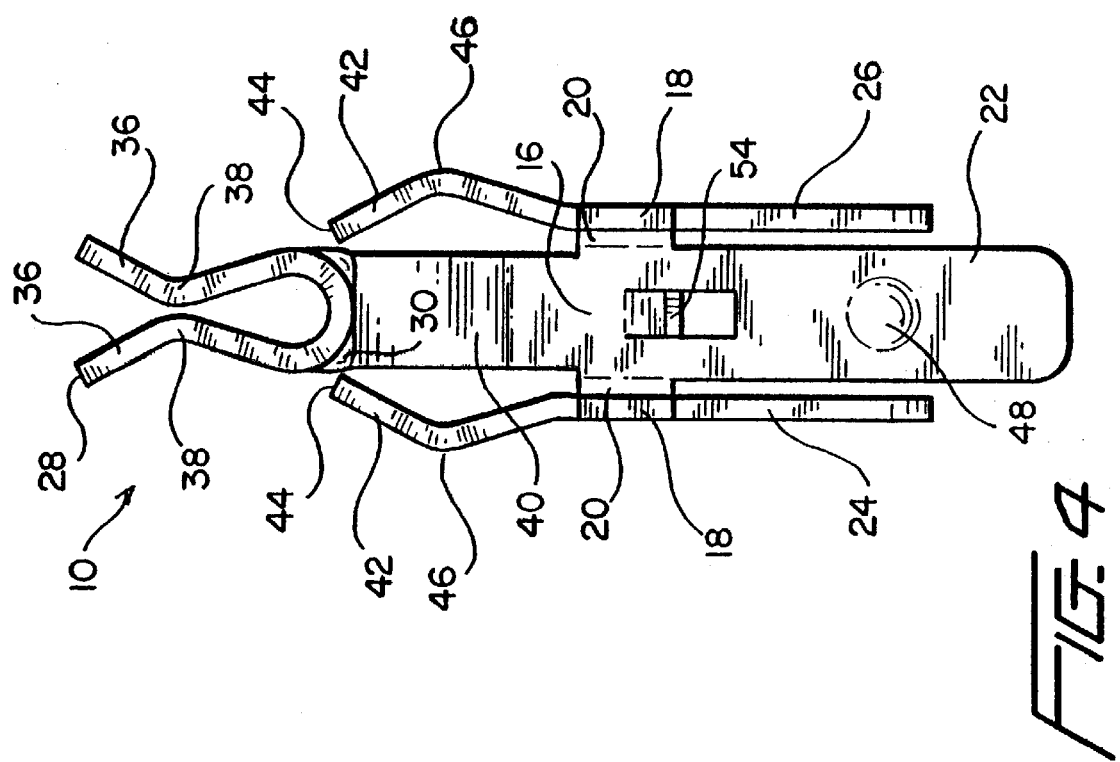
FIG. 3 is a front elevational view of the electrical connector shown in FIG. 1.
Figure 8:
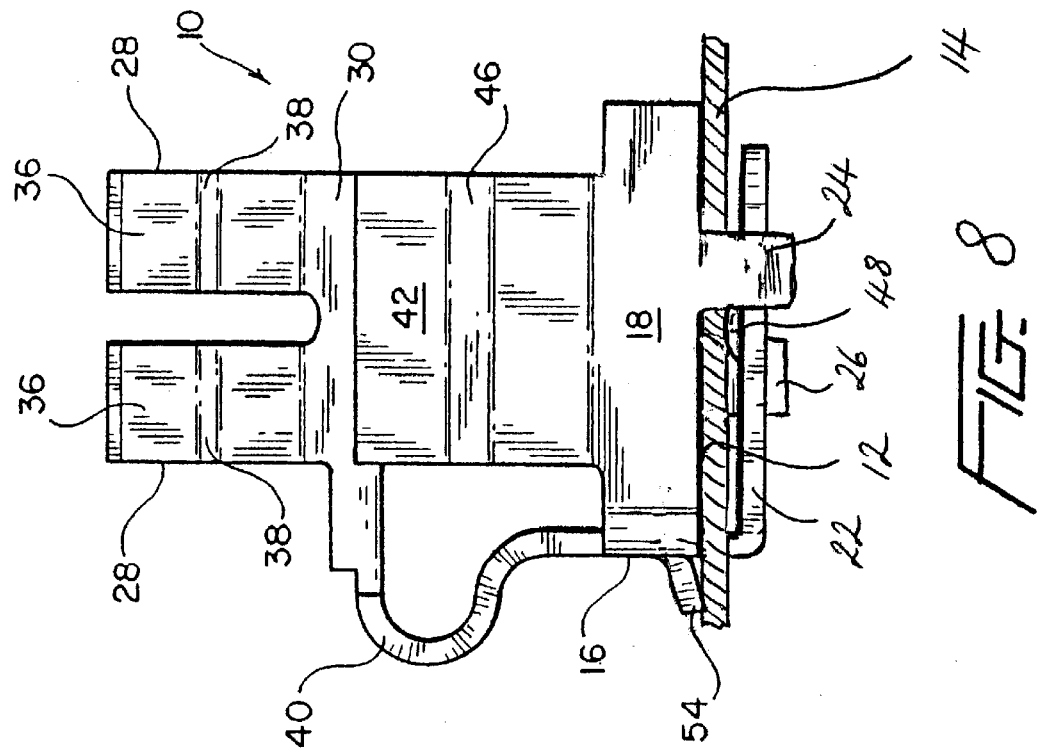
FIG. 8 is a similar view to that shown in FIG. 2 but shows the electrical connector mounted upon the printed circuit board with the dependent legs folded.

FIG. 8 is a similar view to that shown in FIG. 2 but shows the electrical connector 10 mounted upon the printed circuit board 14 with the dependent legs 22, 24 and 26 folded.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. An electrical connector for electrically connecting a component to a printed thick film type printed circuit board, comprising:

a base portion;

means for attaching said base portion to the board;

electrical contacts for electrically connecting the component to said base portion;

means interposed between said electrical contacts and said base portion for vibrationally isolating said base portion, and the board, from said electrical contacts such that any vibrations generated by the component are not transmitted to said base portion and the board; and support members for supporting said electrical contacts during insertion of the component relative to said electrical contacts.

2. The electrical connector as set forth in claim 1, wherein:

said means for vibrationally isolating said base portion from said electrical contacts comprises a flexible member integrally connecting said electrical contacts to said base portion.

3. The electrical connector as set forth in claim 2, wherein:

said flexible member has a substantially S-shaped configuration.

4. The electrical connector as set forth in claim 2, wherein:

said flexible member has a substantially question-mark (?) shaped configuration.

5. The electrical connector as set forth in claim 2, wherein:

said electrical contacts are mounted in a cantilevered manner upon said base portion through means of said flexible member.

6. In combination, an electrical connector for electrically connecting a component to a support panel, comprising:

the support panel;

the component to be mounted upon said support panel;

an electrical connector for electrically connecting said component to said support panel, said electrical connector comprising a base portion;

means for attaching said base portion to said support panel;

electrical contacts for electrically connecting said component to said base portion;

means interposed between said electrical contacts and said base portion for vibrationally isolating said base portion, and said support panel, from said electrical contacts such that any vibrations generated by said component are not transmitted to said base portion and said support panel;

said support panel comprising a printed circuit board;

said printed circuit board comprising a printed thick film type printed circuit board; and support members for supporting said electrical contacts during insertion of the component relative to said electrical contacts.

7. The combination as set forth in claim 6, wherein:

said component comprises a motor.

8. The combination as set forth in claim 6, wherein:

said means for vibrationally isolating said base portion from said electrical contacts comprises a flexible member integrally connecting said electrical contacts to said base portion.

9. The combination as set forth in claim 8, wherein:

said flexible member has a substantially S-shaped configuration.

10. The combination as set forth in claim 8, wherein:

said flexible member has a substantially question-mark (?) shaped configuration.

11. The combination as set forth in claim 8, wherein:

said electrical contacts are mounted in a cantilevered manner upon said base portion through means of said flexible member.

12. An electrical connector for electrically connecting a component to a support panel, comprising:

a base portion;

means for attaching said base portion to a support panel;

electrical contacts flexibly mounted upon said base portion for and adapted to receive electrical connection tabs of a component so as to electrically connect the component to said base portion; and means interposed between said electrical contacts and said base portion for movement between a first position at which said means are fixedly engaged with both of said electrical contacts and said base portion so as to support said electrical contacts in a substantially non-flexible manner whereby electrical connection of the electrical connection tabs of the component to said electrical contacts of said electrical connector can be facilitated, and a second position at which said means are not fixedly engaged with both of said electrical contacts and said base portion so as to permit said electrical contacts of said electrical connector to be flexibly mounted upon said base portion in order to flexibly mount the component, through means of its electrical connection tabs, upon said base portion of said electrical connector.

13. An electrical connector as set forth in claim 12, wherein:

said movable means comprises at least one electrical contact support member mounted upon said base portion in a cantilevered manner.

14. An electrical connector as set forth in claim 13, wherein:

said electrical contacts are mounted upon an electrical contact support beam member; and said movable means comprises a pair of electrical contact support members for engaging opposite lateral sides of said electrical contact support beam member.

15. An electrical connector as set forth in claim 13, wherein:

said at least electrical contact support member is provided with a cut-out apertured region so as to render the same more flexibly movable between said first and second positions.

16. An electrical connector for electrically connecting a component to a support panel, comprising:

a base portion;

electrical contacts for electrically connecting a component to said base portion; and means for attaching said base portion to a support panel comprising a first leg member attached to said base portion and adapted to be inserted through a first aperture defined within the support panel and folded onto the support panel, a second leg member attached to said base portion and adapted to be inserted through a second aperture defined within the support panel and folded over a first portion of said first leg member, and a third leg member attached to said base portion and adapted to be inserted through a third aperture defined within the support panel and folded over a second portion of said first leg member whereby said three folded leg members secure said electrical connector to the support panel.

17. The electrical connector as set forth in claim 16, wherein:

said base portion comprises a three-sided member having a substantially C-shaped configuration;

said first leg member is fixedly attached to an end portion of said base portion; and said second and third leg members are fixedly attached to oppositely disposed sides of said base portion.

18. In combination, an electrical connector for electrically connecting a component to a support panel, comprising:

a support panel having first, second, and third apertures defined therein; and an electrical connector for electrically connecting a component to said support panel, said electrical connector comprising a base portion; electrical contacts for electrically connecting a component to said base portion; and means for attaching said base portion to said support panel comprising a first leg member attached to said base portion and inserted through said first aperture defined within said support panel and folded onto said support panel, a second leg member attached to said base portion and inserted through said second aperture defined within said support panel and folded over a first portion of said first leg member, and a third leg member attached to said base portion and inserted through said third aperture defined within said support panel and folded over a second portion of said first leg member whereby said three folded leg members of said base portion of said electrical connector secure said electrical connector to said support panel.

19. The combination as set forth in claim 18, wherein:

said support panel comprises a printed circuit board.

20. The combination as set forth in claim 19, wherein:

said printed circuit board comprises a printed thick film type printed circuit board, whereby said securement of said electrical connector to said printed circuit board by said three folded leg members secures said electrical connector to said printed circuit board in a solderless manner.

21. The combination as set forth in claim 18, wherein:

said base portion comprises a three-sided member having a substantially C-shaped configuration;

said first leg member is fixedly attached to an end portion of said base portion; and said second and third leg members are fixedly attached to oppositely disposed sides of said base portion.

22. An electrical connector for electrically connecting a component to a support panel, comprising:

a base portion;

means for attaching said base portion to the support panel;

electrical contacts for electrically connecting the component to said base portion;

means interposed between said electrical contacts and said base portion for vibrationally isolating said base portion, and the support panel, from said electrical contacts such that any vibrations generated by the component are not transmitted to said base portion and the support panel;

said means for vibrationally isolating said base portion from said electrical contacts comprising a flexible member integrally connecting said electrical contacts to said base portion;

said flexible member having a substantially S-shaped configuration; and support members for supporting said electrical contacts during insertion of the component relative to said electrical contacts.

23. An electrical connector for electrically connecting a component to a support panel, comprising:

a base portion;

means for attaching said base portion to the support panel;

electrical contacts for electrically connecting the component to said base portion;

means interposed between said electrical contacts and said base portion for vibrationally isolating said base portion, and the support panel, from said electrical contacts such that any vibrations generated by the component are not transmitted to said base portion and the support panel;

said means for vibrationally isolating said base portion from said electrical contacts comprising a flexible member integrally connecting said electrical contacts to said base portion;

said electrical contacts being mounted in a cantilevered manner upon said base portion through means of said flexible member; and contact support members for supporting said electrical contacts during insertion of the component relative to said electrical contacts for providing requisite support force and resistance to deflection of said contacts.

\* \* \* \* \*